US008228364B2

(12) United States Patent
Cilia

(10) Patent No.: US 8,228,364 B2
(45) Date of Patent: Jul. 24, 2012

(54) OMNIDIRECTIONAL CAMERA FOR USE IN POLICE CAR EVENT RECORDING

(75) Inventor: Andrew Cilia, McKinney, TX (US)

(73) Assignee: Enforcement Video, LLC, Allen, TX (US)

( * ) Notice: Subject to any disclaimer, the term of this patent is extended or adjusted under 35 U.S.C. 154(b) by 832 days.

(21) Appl. No.: 12/362,381

(22) Filed: Jan. 29, 2009

(65) Prior Publication Data

US 2009/0251530 A1 Oct. 8, 2009

Related U.S. Application Data

(60) Provisional application No. 61/024,328, filed on Jan. 29, 2008.

(51) Int. Cl.
*H04N 7/00* (2006.01)
(52) U.S. Cl. .......................................... 348/39
(58) Field of Classification Search ............ 348/39
See application file for complete search history.

(56) References Cited

U.S. PATENT DOCUMENTS

| | | | |
|---|---|---|---|
| 4,949,186 A | 8/1990 | Peterson | |
| 5,651,075 A | 7/1997 | Frazier et al. | |
| 5,677,979 A | 10/1997 | Squicciarini et al. | |
| 5,703,604 A | 12/1997 | McCutchen | |
| 5,809,161 A | 9/1998 | Auty et al. | |
| 5,844,599 A | 12/1998 | Hildin | |
| 6,252,989 B1 | 6/2001 | Geisler et al. | |
| 6,282,462 B1 | 8/2001 | Hopkins | |
| 6,335,789 B1 | 1/2002 | Kikuchi | |
| 6,373,962 B1 | 4/2002 | Kanade et al. | |
| 6,445,824 B2 | 9/2002 | Hieda | |
| 6,456,321 B1 | 9/2002 | Ito et al. | |
| 6,704,281 B1 | 3/2004 | Hourunranta et al. | |
| 6,707,489 B1 | 3/2004 | Maeng et al. | |
| 6,801,574 B2 | 10/2004 | Takeuchi et al. | |
| 6,831,556 B1 | 12/2004 | Boykin | |
| 7,119,832 B2 | 10/2006 | Blanco et al. | |
| 7,262,790 B2 | 8/2007 | Bakewell | |
| 7,272,179 B2 | 9/2007 | Siemens et al. | |
| 7,405,834 B1 | 7/2008 | Marron et al. | |
| 7,495,579 B2 | 2/2009 | Sirota et al. | |
| 7,574,131 B2 * | 8/2009 | Chang et al. | 396/322 |
| 7,711,150 B2 | 5/2010 | Simon | |
| 7,768,548 B2 * | 8/2010 | Silvernail et al. | 348/148 |
| 7,894,632 B2 | 2/2011 | Park et al. | |
| 7,929,010 B2 | 4/2011 | Narasimhan | |
| 8,022,874 B2 * | 9/2011 | Frieaizen | 342/445 |

(Continued)

OTHER PUBLICATIONS

Kortum, P. et al., "Implementation of a foveated image coding system for image bandwidth reduction", SPIE Proceedings, vol. 2657, 1996, pp. 350-360, XP-002636638.

(Continued)

*Primary Examiner* — Douglas Blair
(74) *Attorney, Agent, or Firm* — Winstead PC

(57) ABSTRACT

A system and method for an omnidirectional camera for use in recording events around a police vehicle is disclosed. The system and method include an omnidirectional camera and a digital processor for processing the omnidirectional images captured by the omnidirectional camera. The digital processor may be operable to locate one or more regions of interests disposed within the omnidirectional images. A recordable medium is also disclosed for storing at least some of the captured images.

13 Claims, 5 Drawing Sheets

U.S. PATENT DOCUMENTS

| | | |
|---|---|---|
| 2002/0064314 A1 | 5/2002 | Comaniciu et al. |
| 2002/0140924 A1 | 10/2002 | Wangler et al. |
| 2002/0141618 A1 | 10/2002 | Ciolli et al. |
| 2002/0141650 A1 | 10/2002 | Keeney et al. |
| 2002/0149476 A1 | 10/2002 | Ogura |
| 2003/0025599 A1 | 2/2003 | Monroe |
| 2003/0071891 A1 | 4/2003 | Geng |
| 2003/0214585 A1 | 11/2003 | Bakewell |
| 2004/0056779 A1 | 3/2004 | Rast |
| 2004/0150717 A1 | 8/2004 | Page et al. |
| 2004/0218099 A1 | 11/2004 | Washington |
| 2004/0223058 A1 | 11/2004 | Richter et al. |
| 2004/0252193 A1 | 12/2004 | Higgins |
| 2004/0258149 A1 | 12/2004 | Robinson et al. |
| 2005/0090961 A1 | 4/2005 | Bonk et al. |
| 2006/0152636 A1 | 7/2006 | Matsukawa et al. |
| 2006/0158968 A1 | 7/2006 | Vanman et al. |
| 2006/0159325 A1 | 7/2006 | Zeineh et al. |
| 2006/0187305 A1* | 8/2006 | Trivedi et al. ............... 348/169 |
| 2006/0193384 A1 | 8/2006 | Boyce |
| 2007/0024706 A1 | 2/2007 | Brannon et al. |
| 2007/0029825 A1 | 2/2007 | Franklin et al. |
| 2007/0200933 A1 | 8/2007 | Watanabe et al. |
| 2007/0217761 A1 | 9/2007 | Chen et al. |
| 2007/0222678 A1 | 9/2007 | Ishio et al. |
| 2007/0222859 A1 | 9/2007 | Chang et al. |
| 2007/0296817 A1 | 12/2007 | Ebrahimi et al. |
| 2008/0007438 A1 | 1/2008 | Segall et al. |
| 2009/0046157 A1 | 2/2009 | Cilia et al. |
| 2009/0049491 A1 | 2/2009 | Karonen et al. |
| 2009/0129672 A1 | 5/2009 | Camp, Jr. et al. |
| 2009/0207248 A1 | 8/2009 | Cilia et al. |
| 2009/0213218 A1 | 8/2009 | Cilia et al. |

OTHER PUBLICATIONS

Geisler, Wilson S. et al., "A real-time foveated multiresolution system for low-bandwidth video communication", Proceedings of the SPIE—The International Society for Optical Engineering SPIE-Int. Soc. Opt. Eng. USA, vol. 3299, 1998, pp. 294-305, XP-002636639.
U.S. Appl. No. 12/694,931, Cilia.
U.S. Appl. No. 12/779,492, Vanman.
U.S. Appl. No. 12/779,564, Vanman.
U.S. Appl. No. 12/780,050, Vanman.
U.S. Appl. No. 12/780,092, Vanman.
U.S. Appl. No. 12/362,302, Andrew Cilia et al.
U.S. Appl. No. 13/095,107, Cilia.
U.S. Appl. No. 13/109,557, Cilia.
Copenheaver, Blaine R., International Search Report for PCT/US2009/000930 as mailed Apr. 9, 2009, (4 pages).
Young, Lee W., International Search Report for PCT/US2009/000934 as mailed Apr. 29, 2009, (3 pages).
Copenheaver, Blaine R., International Search Report for PCT/US2010030861 as mailed Jun. 21, 2010, (4 pages).
Nhon, Diep T., International Search Report for PCT/US05/36701 as mailed Oct. 25, 2006, 5 pages.
Copenheaver, Blaine, R. International Search Report for PCT/US2009/032462 as mailed Mar. 10, 2009 (4 pages).

* cited by examiner

OMNIDIRECTIONAL CAMERA FOR USE IN POLICE CAR EVENT RECORDING

CROSS-REFERENCE TO RELATED APPLICATIONS

This application claims priority to and incorporates by reference the entire disclosure of U.S. Provisional Patent Application No. 61/024,328 filed on Jan. 29, 2008.

TECHNICAL FIELD

In general, this application relates to video-recording devices and more particularly, but not by way of limitation, to omnidirectional video-recording devices for use with law-enforcement vehicles.

BACKGROUND

Cameras and other video-recording devices have long been used to capture still and video images. In general, cameras consist of an enclosed hollow portion with an opening or aperture at one end to allow light to enter and a recording surface for capturing the light at the other end. In addition, cameras often have a lens positioned in front of the aperture along an optical axis to gather the incoming light and focus all or part of an image onto the recording surface. Fields of view vary from camera to camera, but in general, most cameras have a field of view that ranges from a few degrees to, at most, 180°.

In the past, to overcome the limited field of view, surveillance cameras used for monitoring large areas were oftentimes mounted to mechanisms adapted to enable the camera to pan, tilt, and zoom in order to move objects into the camera's field of view. One type of camera, called an omnidirectional camera, has been used to monitor large areas without a need for mechanisms to enable pan, tilt, and zoom. An omnidirectional camera is a camera with an omnidirectional field of view, such as, for example, a 360-degree field of view. Some omnidirectional cameras may be adapted to capture images from all directions (a full sphere). However, many omnidirectional cameras do not capture a full sphere of images, but rather capture 360 degree of images along a single axis with the field of view being limited angularly above and below the axis.

The use of dashboard cameras in police vehicles has been well known for many years and is an integral part of a police department's evidence-gathering capability. One limitation of conventional cameras is the limited field of vision. Devices that include a movable camera and having near 360-degree capability have been developed. One limitation of these devices is the time it takes to pan or tilt the camera. An additional limitation relates to the reliability issues commonly associated with devices having moving parts. More recently, devices with at or near 360 degree image-capturing capability have been developed that do not require mechanical panning, tilting, and zooming. However, these devices often require large amounts of data storage and often record large amounts of irrelevant images.

SUMMARY

In view of the foregoing and other considerations, the present invention relates generally to video-recording devices and more particularly, but not by way of limitation, to omnidirectional video-recording devices for use with law-enforcement vehicles.

In accordance with one aspect of the present invention, a system is provided for capturing and storing images, the system including an omnidirectional camera mounted to a vehicle and operable to capture an omnidirectional image of a scene surrounding the omnidirectional camera; a digital processor coupled to the omnidirectional camera and operable to receive the captured omnidirectional image; the digital processor being operable to locate one or more regions of interest within the omnidirectional image; and a storage medium coupled to the digital processor and operable to receive and store a first subset of the omnidirectional image corresponding to the one or more regions of interest.

More specifically, the system may also include wherein the digital processor is operable to compress the first subset to a first resolution and to compress a second subset of the omnidirectional image to a second resolution; the second subset of the omnidirectional image is stored in the storage medium at the second resolution; and wherein the first resolution is greater than the second resolution. The system may also include wherein the digital processor is operable to delete the omnidirectional image other than the first subset. The system may also include a wireless microphone disposed within the scene; and wherein the digital processor is operable to utilize a signal-detection algorithm to determine a location of at least one of the one or more regions of interest based at least in part on one or more signals received from the wireless microphone. The system may also include wherein the digital processor is operable to utilize a gaze-estimation algorithm to determine a location of at least one of the one or more regions of interest based at least in part on the direction a person is looking. The system may also include wherein the digital processor is operable to utilize an object-detection algorithm to determine a location of at least one of the one or more regions of interest. The system may also include an optical target disposed in the scene; and wherein the digital processor is operable to utilize an optical-target detection algorithm to determine a location of at least one of the one or more regions of interest.

In accordance with another aspect of the present invention, a method is provided for capturing and storing images, the method including providing an omnidirectional camera mounted to a vehicle and operable to capture an omnidirectional image of a scene surrounding the omnidirectional camera; transmitting the omnidirectional image to a digital processor coupled to the omnidirectional camera; locating, via the digital processor, at least one region of interest within the omnidirectional image, the at least one region of interest corresponding to a first subset of the omnidirectional image; compressing the first subset to a first resolution; and storing the compressed first subset in a storage medium coupled to the digital processor.

More specifically, the method may also include compressing a second subset of the omnidirectional image to a second resolution; wherein the first resolution is greater than the second resolution; and storing the second subset of the omnidirectional image in the storage medium. The method may also include deleting a second subset of the omnidirectional image the second subset being mutually exclusive of the first subset of the omnidirectional image. The method may also include wherein the at least one region of interest corresponds to an area of the scene immediately surrounding a law enforcement officer. The method may also include coupling an antenna to the digital processor; detecting, via the antenna and the digital processor, a signal from a wireless device; determining, by the digital processor, from what direction the signal came; and using the determined direction to locate the at least one region of interest. The method may also include disposing an optical target in the scene; detecting, via the digital processor, a location of the optical target; and determining the at least one region of interest via the detected location. The method may also include estimating a direction in which a person is looking; and determining the at least one region of interest via the estimated direction.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
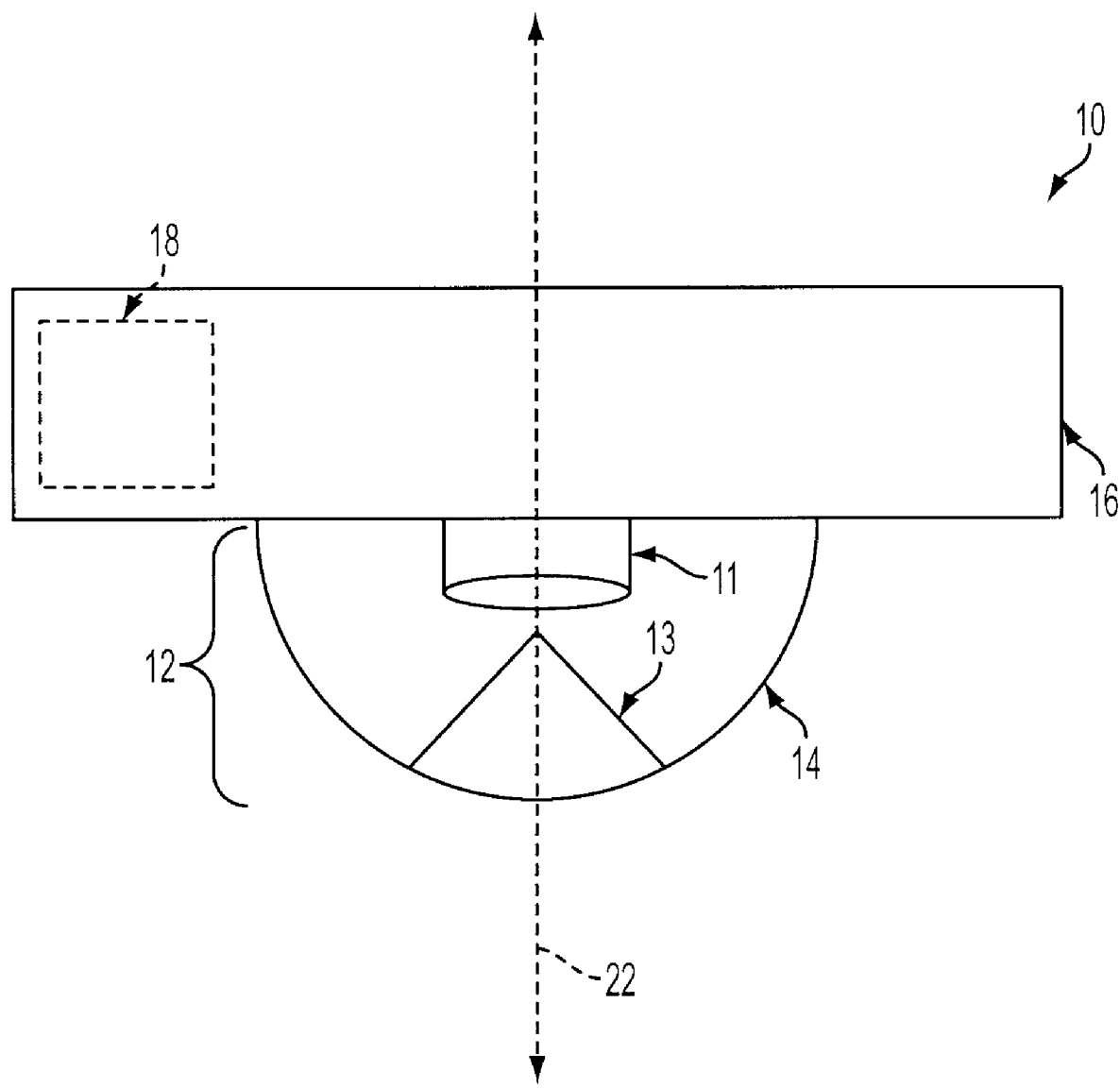
FIG. 1 is an image-capturing system.

FIG. 1 shows an image-capturing system 10. In the embodiment shown, the system 10 includes an omnidirectional camera 12 coupled to a computer 16. The omnidirectional camera 12 may include a camera 11 arranged adjacent to an external lens 13 and a dome 14, the dome 14 being concave relative to the camera 11. The dome 14 and lens 13 in combination are adapted to allow light to pass therethrough. In some embodiments, the dome 14 may be convex relative to the camera 11, the dome 14 and lens 13 in combination being adapted to reflect light towards the camera 11. The camera 11, in combination with the dome 14 and the lens 13, may form part or all of the omnidirectional camera 12. The omnidirectional camera 12 may be adapted to capture a single omnidirectional still image and/or may be a video camera adapted to sequentially capture a plurality of omnidirectional images. The omnidirectional image may be a 360-degree image of a scene surrounding the omnidirectional camera 12, wherein 360 degrees is relative to an optical axis 22 of the camera 11. As referred to herein, an omnidirectional camera is a camera adapted to capture omnidirectional images where the omnidirectional camera may be any camera and/or camera system adapted to capture wide-angle images from a wide-angle field of view up to and including 360-degree images from a 360-degree field of view. As referred to herein, an omnidirectional image is an image captured by an omnidirectional camera where the omnidirectional image may be a wide-angle image from a wide-angle field of view up to and including a 360-degree image from a 360-degree field of view. In some embodiments, the omnidirectional camera may have a field of view ranging from on the order of 180°, 190°, 200°, 210°, 220°, 230°, 240°, 250°, 260°, 270°, 280°, 290°, 300°, 310°, 320°, 330°, 340°, 350°, and/or 360° and the omnidirectional images may be less than or equal to the omnidirectional camera fields of view. In some embodiments, the omnidirectional camera 12 may be a high-definition camera such as, for example, a camera having a sensor adapted to capture images on the order of several Megapixels.

The lens 13 may be adapted to focus omnidirectional images, such as a wide-angle lens, a super-wide-angle lens, a fish-eye lens, a full-circle lens, a spherical mirror-type lens, a conical mirror-type lens, or other lens and/or mirror configuration capable of focusing omnidirectional images. In some embodiments, the computer 16 may be a standalone unit and/or may be remotely disposed from the omnidirectional camera 12, but in the embodiment shown is integrated with the omnidirectional camera 12. The computer 16 typically includes a digital processor coupled to a data-storage device 18 that may be used to store at least a portion of captured images. The data-storage device 18 may include, for example, an internal hard drive, an external hard drive, and/or a writable/rewritable drive, such as a CD and/or DVD drive.

Figure 2:
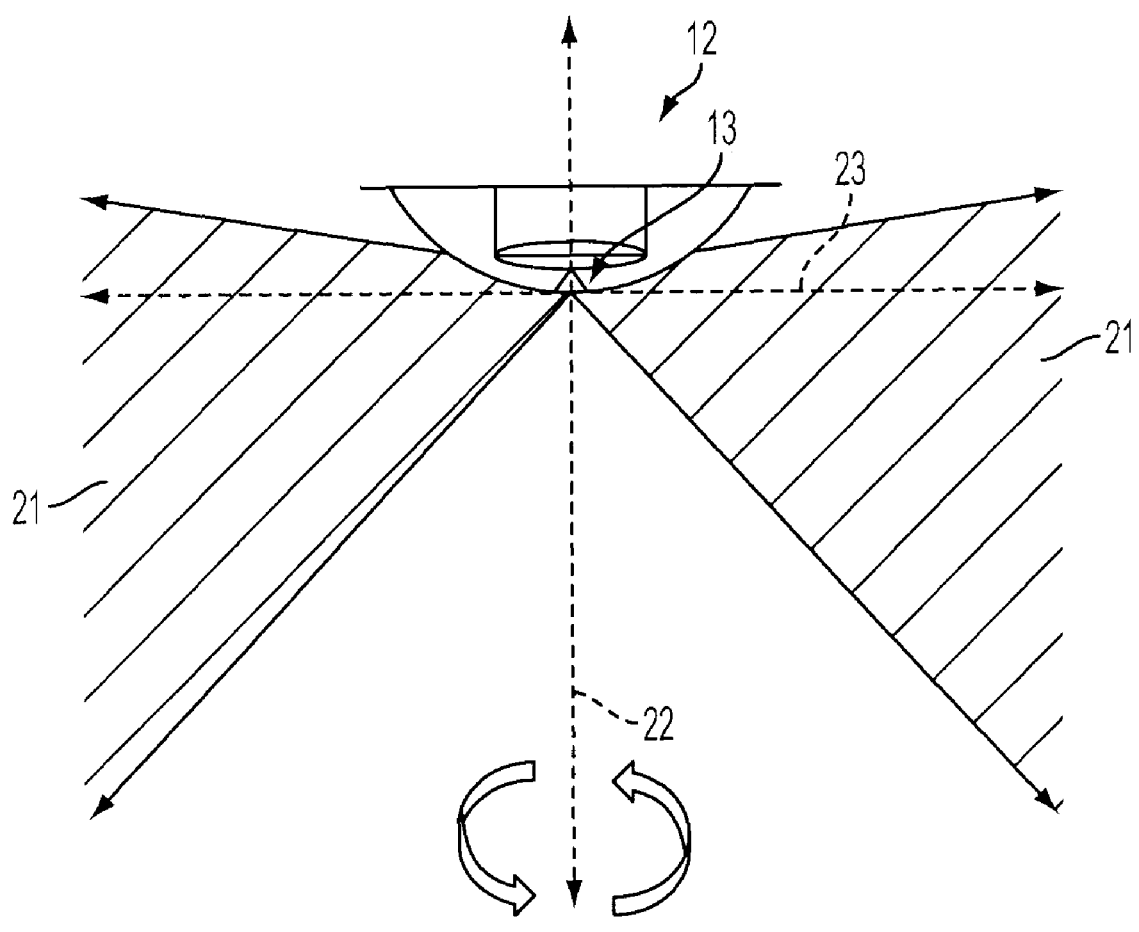
FIG. 2 is a field of view of the image-capturing system of FIG. 1.

FIG. 2 shows a field of view (FOV) of an embodiment of an omnidirectional camera 12. For descriptive purposes, a coordinate system has been overlaid having an optical axis 22 shown running vertically along the optical axis of the omnidirectional camera 12 and a horizontal axis 23 perpendicular thereto and passing through the lens 13. In general, the FOV of a camera is the area of a scene around the camera that can be captured by the camera. The FOV 21 of the omnidirectional camera 12 along the horizontal axis 23 is shown. The FOV 21 extends both above and below the horizontal axis 23. For example, in the embodiment shown, the FOV 21 extends approximately 10 degrees above the horizontal axis 23 and approximately 45 degrees below the horizontal axis 23. In various embodiments, the FOV 21 may extend more than or less than 10 degrees above the horizontal axis 23 and/or may extend more than or less than 45 degrees below the horizontal axis 23. Although FIG. 2 shows the FOV 21 along one axis, the full FOV of the omnidirectional camera 12 may include all 360 degrees of rotation about the optical axis 22. The entire panorama of the omnidirectional camera 12 would then be a 55°×360° FOV, where the 55 degrees represents the size of the angle relative to the horizontal axis 23.

Figure 3:
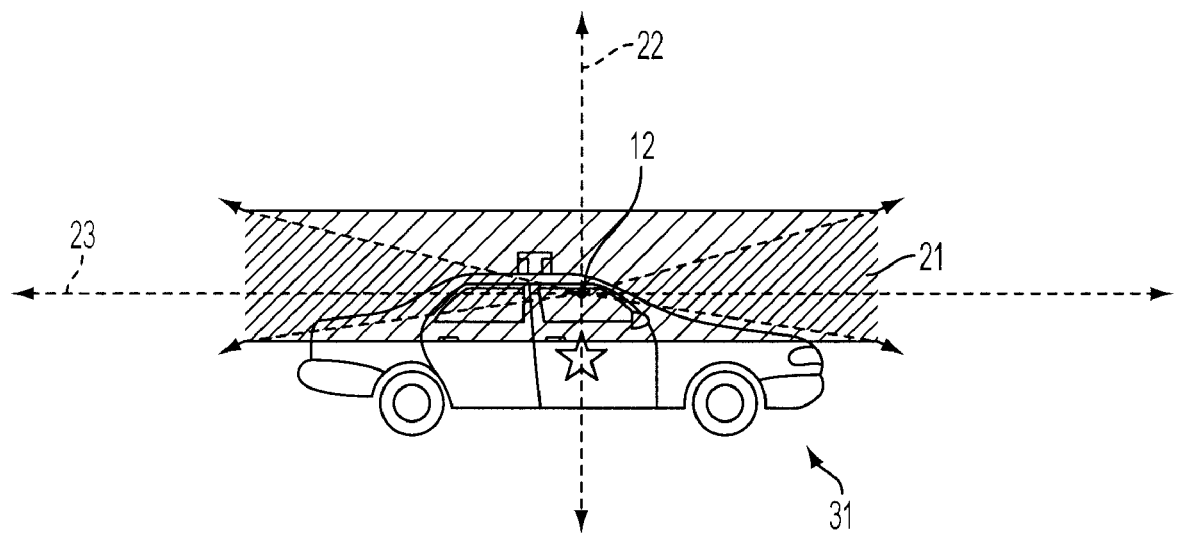
FIG. 3 is a side view of a field of view of the image-capturing system relative to a police vehicle.

Referring now to FIG. 3, an omnidirectional camera 12 mounted on the ceiling of a police vehicle 31 is shown. It can be seen that the FOV 21 of the omnidirectional camera 12 extends outwardly from the police vehicle 31 so that images of objects from the surroundings of the vehicle 31 that are within the FOV 21 can be captured. In the embodiment shown, the omnidirectional camera 12 is mounted to the interior of the police vehicle 31. However, the omnidirectional camera 12 may be adapted to be mounted in a variety of other locations, such as, for example, on a dashboard, on a rearview mirror, on an exterior roof, on or near a trunk, and/or on or near a hood of the police vehicle. Similarly, the omnidirectional camera 12 may be adapted to be mounted on a car, motorcycle, boat, helicopter, van, truck, and/or any mobile or stationary location where monitoring a surrounding would be desirable.

In some embodiments, the omnidirectional image may be a high-resolution image and may be sent to a digital processor to be analyzed, compressed, and/or stored. Oftentimes, the high-resolution omnidirectional image may be compressed before storage to reduce the amount of memory needed to store the omnidirectional image. Because the omnidirectional camera may capture images from less than or an entire 360 degrees, large portions of the omnidirectional image being captured may be irrelevant. In some embodiments, the digital processor may separate the omnidirectional image into subsets and compress the subsets to different resolutions before storing some or all of the subsets. For example, subsets determined to be more relevant may be stored at a higher resolution than subsets determined to be less relevant. In some embodiments, less relevant subsets may be stored at a very low resolution or may be discarded instead of being stored so that data-storage capacity of the data-storage device is not consumed by the less relevant subsets. In some embodiments, the subsets of the omnidirectional image may be large regions, such as quadrants, and only those subdivisions determined to be relevant are stored or are stored at a higher resolution than the other subdivisions.

Figure 4:
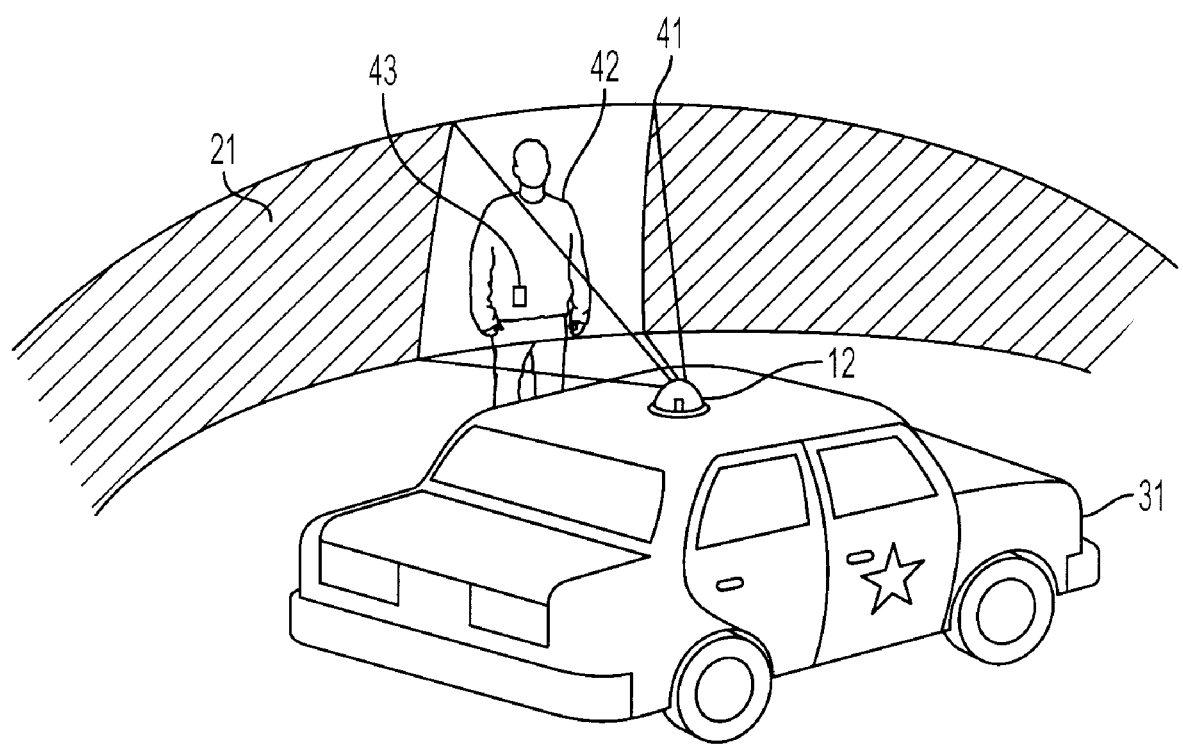
FIG. 4 is a perspective view of region of interest located in a field of view of the image-capturing system relative to a police vehicle.

Referring now to FIG. 4, an omnidirectional camera 12 is shown mounted to an external roof of a police vehicle 31. In the embodiment shown, the omnidirectional camera 12 captures an omnidirectional image of the scene surrounding the police vehicle 31 within the FOV 21. In the embodiment shown, an area of the scene containing a person has been located as an area of interest within the FOV 21 of the omnidirectional camera 12. A region of interest (ROI) 41 may then be defined within the omnidirectional image corresponding to the located area of interest. For example, a digital processor (not shown) may be adapted to define the ROI 41 to include the subset of the omnidirectional image immediately surrounding a police officer. In some embodiments, the image captured may be a panoramic image of less than the full 360 degrees surrounding the camera, where the digital processor defines the ROI 41 to include less than the entire panoramic image.

In some embodiments, the digital processor may be adapted to track an object, such as a person, as the location of the object in the FOV 21 changes by moving the ROI 41 correspondingly. As will be described in more detail below, the digital processor may be adapted to utilize one or more detecting and/or tracking algorithms to determine where to locate and/or move the ROI 41, such as, for example, a signal-detection algorithm for tracking a signal of a wireless microphone worn by the officer, a gaze-estimation algorithm for estimating a direction a person is looking, an object-detection algorithm for identifying and tracking specific features of an object, a target, or a person, a motion-detection algorithm for identifying movement of objects, and/or an algorithm for allowing user input. In some embodiments, the ROI 41 may be stored at a relatively higher resolution while the remaining areas of the captured omnidirectional image may either be discarded or stored at a lower resolution. In some embodiments, an entire omnidirectional image may be discarded if it is determined that no ROI is present at that particular time.

The above-mentioned signal-detection algorithm may include one or more antennae coupled to the digital processor for determining a location of an officer 42 relative to the camera. For example, as an officer walks from a driver's door of the police vehicle around a front of the police vehicle, signals originating from a signal-generating device 43 such as, for example, a wireless microphone worn by the officer 42, will reflect the movement. The digital processor may be adapted to define the ROI 41 as the subset of the omnidirectional image from the same direction as the origination of the signals from the signal-generating device 43. For example, when the officer is standing next to the driver's door, the ROI may be a front-left quadrant relative to the police vehicle of the omnidirectional image. When the police officer 42 moves around to the passenger side, the ROI may be a front-right quadrant relative to the police vehicle of the omnidirectional image. In various embodiments, the subset containing the ROI 41 may be more or less than a quadrant of the omnidirectional image.

The above-mentioned gaze-estimation algorithm may be utilized to estimate which direction a person within the FOV is looking. An ROI may then be defined as the subset of the omnidirectional image from that direction. When the omnidirectional camera is mounted inside a police vehicle, the omnidirectional image captured may include areas from both the interior and the exterior of the police vehicle. In some embodiments, the digital processor may be adapted to determine the orientation of a person's head and estimate the direction the person is looking.

In some embodiments, a portion of the omnidirectional image being captured may include a facial region of a person, for example, a driver or passenger of a vehicle. In some embodiments, the digital processor may be adapted to determine the direction a person is looking by analyzing the direction a person's eyes are pointing. The ROI can then be defined as the subset of the omnidirectional image in that direction. In some embodiments, the gaze-estimation algorithm may be calibrated for accuracy by having a driver look at several reference points during a calibration process. In other embodiments, the gaze-estimation algorithm may automatically detect the direction without requiring a calibration process.

In some embodiments, the accuracy of the gaze estimation may allow an area where a person is looking to be pinpointed to within approximately 5° to 7°. In some embodiments, accuracy may be improved by tracking a person's eye movements as the person views the edges of an object. The movements may then be compared to objects in the FOV in the direction the person is looking. For example, if a person is looking at a sphere sitting next to a cube, the person's eyes will make more rounded movements rather than straight movements along an edge of a cube. The digital processor may be adapted to detect this difference and define the ROI as the sphere, rather than the cube. In some embodiments, the object may then be tracked even after the person looks away. In some embodiments, the object is no longer tracked once the person looks away.

The above-mentioned object-detection algorithm may include various algorithms adapted to detect various features of an object of interest in order to identify and track the object. For example, an optical target may be disposed on an officer and an optical-target detection algorithm may be utilized to track the officer. In some embodiments, the optical target may be a part of the officer's uniform, such as for example, a badge or cap of the officer. In some embodiments, the optical target is an object specifically designed to facilitate tracking of the officer. In other embodiments, a facial-feature tracking algorithm may be adapted to locate human faces within the omnidirectional image. An ROI may then be defined to include the located face. In some embodiments, a facial-recognition algorithm may be utilized to identify the person in the FOV.

In some embodiments, an object-outline algorithm may be utilized to detect a person in an image by detecting outlines of various body portions. For example, an outline of a head, while difficult to differentiate from other round objects, may be used to detect the presence of a person in the FOV if the outline of shoulders is also detected in a head-and-shoulders type relationship. In some embodiments, a vehicle-detection algorithm may be utilized to detect the presence of vehicles within the FOV. For example, reference points may be taken from various points around an object to determine if the object is a vehicle. In some embodiments, reference points may be taken from around the vehicle to determine the size and shape of the vehicle and to identify the make and model of the vehicle. In some embodiments, a still image of the ROI may be saved, the ROI may be saved at a higher resolution than other areas of the image, and/or information about the ROI may be saved as metadata. In various embodiments, the object-detection algorithm may be operable to automatically detect the presence of one or more of a plurality of objects such as, for example, a license plate, a body part, such as a head, face, or limb, a weapon, a flash of a weapon discharge, and/or any other object that may be desirable to detect and/or track. In some embodiments, the algorithm may be adapted to automatically detect some or all of a plurality of objects and/or the algorithm may be adapted to allow a user to select one or more of a plurality of objects for the algorithm to detect and/or track.

In the above mentioned motion-detection algorithm, movement of an object within the FOV may be detected and an ROI may be defined to track the moving object. For example, the algorithm may be adapted to locate objects that exhibit known motion patterns, such as, for example, a human gait, a moving vehicle, such as an approaching or receding vehicle, a moving person, sudden motion changes, such as a car accident, predetermined gestures by a person in the FOV, and/or other detectable motions. In some embodiments, the sensitivity of the algorithm may be adjusted by a user so that minor or irrelevant movements will not trigger the creation of an ROI. For example, in some embodiments, the algorithm may be adapted to reject an ROI or possible ROI based on spatial and/or motion analysis, such as, for example, cars passing an officer during a traffic stop.

In the above-mentioned algorithm for allowing user input, a digital processor may be adapted to define an ROI based at least in part on input received from a user. For example, a user control may be coupled to the digital processor for allowing a user to designate the ROI, such as, for example, a joystick, a mouse, a trackball, a directional button such as a pan/tilt/zoom button or buttons. In some embodiments, a captured image is displayed on a viewable screen or projector and an area is outlined and/or highlighted on the display. The user may move the area and/or move the image being displayed to define the ROI.

Figure 5:
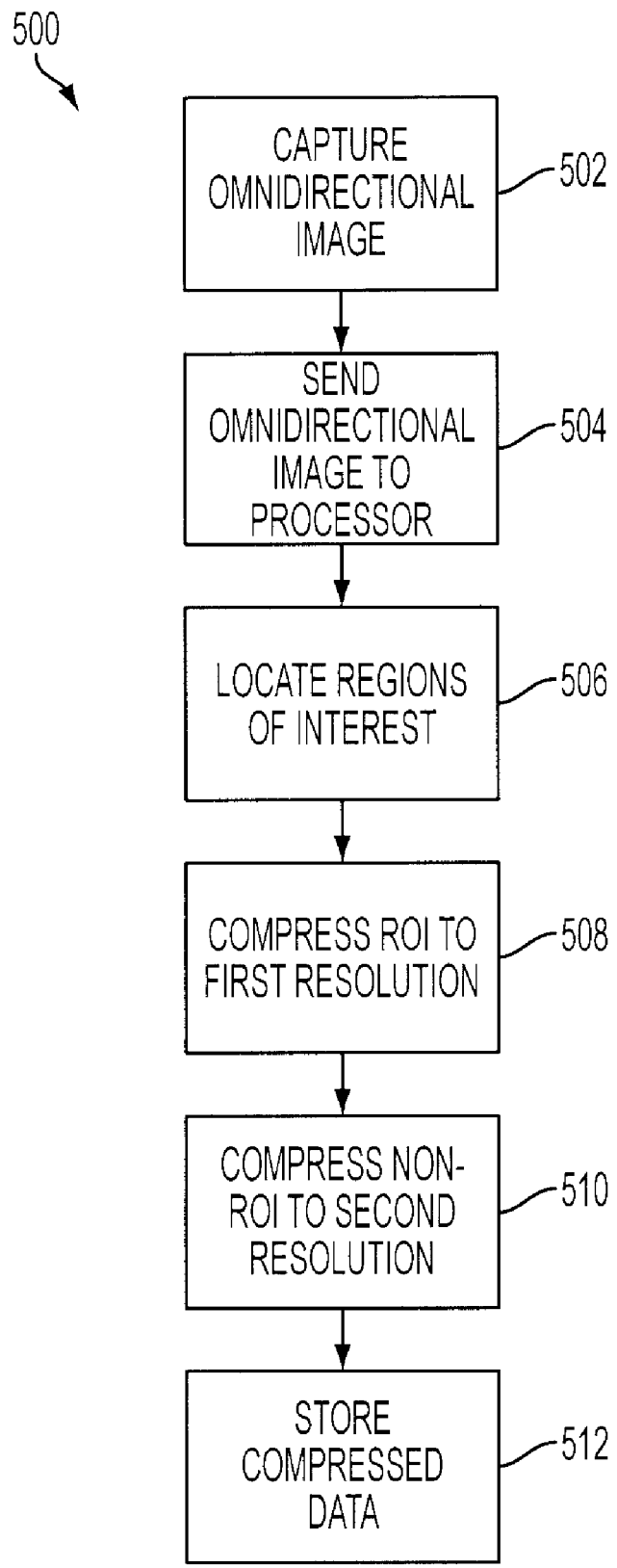
FIG. 5 is a flow chart of a method for capturing omnidirectional images.

Referring now to FIG. 5, a flow chart of a process 500 for capturing an omnidirectional image is shown. In the process 500, an image-capture device, such as an omnidirectional camera, captures an omnidirectional image in a field of view of the camera at step 502. In some embodiments, the camera may be mounted relative to a police car and adapted to capture an image while the police vehicle is moving and also when the police vehicle is stopped, for example, during a traffic stop.

From step 502, execution proceeds to step 504. The captured omnidirectional images are sent to a processor at step 504. At step 506, one or more regions of interest (ROI) in the captured image are located. In some embodiments, the raw data of the captured image may be read and an automatic ROI locator algorithm may be run. In some embodiments, the digital processor may, for example, run a facial-feature location algorithm to identify whether there are people in the field of view. In various embodiments, one or more location algorithms are run on raw data coming from the omnidirectional camera. In some embodiments, one or more of the algorithms may be run on compressed data and a feedback signal sent as to the location of the ROI.

After the one or more ROI have been located, at step 508, the digital processor uses the location information relative to each of the ROIs to compress each of the ROIs to a first resolution. For example, the location information may be one or more sets of coordinates and/or vectors. At step 510, non-ROI subsets of the image are compressed to a second resolution. At step 112, some or all of the compressed image is stored on a recordable medium such as, for example, a DVD.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A system for capturing and storing images, the system comprising:
    an omnidirectional camera mounted to a vehicle and operable to capture an omnidirectional image of a scene in a field of view of the omnidirectional camera;
    a digital processor coupled to the omnidirectional camera and operable to receive the captured omnidirectional image;
    the digital processor being operable to locate an area of interest from the scene and define a first subset of the omnidirectional image corresponding to the area of interest as a region of interest and a second subset of the omnidirectional image mutually exclusive of the first subset;
    a data-storage device coupled to the digital processor and operable to receive and store the first subset at a first resolution;
    the digital processor being operable to perform at least one of the following:
        discard the second subset; and
        save the second subset at a second resolution lower than the first resolution;
    at least one antenna coupled to the digital processor, wherein the at least one antenna and the digital processor detect a signal from a signal-generating device; and
    wherein the digital processor determines a direction of the signal and using the determined direction, defines the at least one region of interest.

2. The system of claim 1, wherein the field of view of the omnidirectional camera is a 360-degree field of view.

3. The system of claim 1, wherein the field of view of the omnidirectional camera is less than 360 degrees.

4. The system of claim 1, wherein the signal-generating device comprises a wireless microphone.

5. The system of claim 1, wherein the digital processor defines the region of interest based in at least partial dependence on a user input.

6. A method of capturing and storing images, the method comprising:
    providing an omnidirectional camera mounted to a vehicle and operable to capture an omnidirectional image of a scene in a field of view of the omnidirectional camera;
    transmitting the omnidirectional image to a digital processor coupled to the omnidirectional camera;
    locating, via the digital processor, an area of interest from the scene;
    defining, via the digital processor, at least one region of interest within the omnidirectional image corresponding to the area of interest, the at least one region of interest corresponding to a first subset of the omnidirectional image;
    storing the first subset at a first resolution in a data-storage device coupled to the digital processor;
    performing a step selected from the group consisting of:
        storing a second subset of the omnidirectional image at a second resolution in the data-storage device, the first resolution being greater than the second resolution; and
        discarding the second subset of the omnidirectional image;
    coupling one or more antennae to the digital processor;
    detecting, via at least one of the one or more antennae and the digital processor, a signal from a wireless device;
    determining, by the digital processor, from what direction the signal came; and using the determined direction to define the at least one region of interest.

7. The method of claim 6, wherein the field of view of the omnidirectional camera is a 360-degree field of view.

8. The method of claim 6, wherein the field of view of the omnidirectional camera is less than 360 degrees.

9. The method of claim 6, wherein the second subset is mutually exclusive of the first subset.

10. The method of claim 6, wherein the at least one region of interest corresponds to an area of the scene immediately surrounding a law enforcement officer.

11. The method of claim 6, wherein the at least one region of interest is defined based in at least partial dependence on user input.

12. A method of capturing and storing images, the method comprising:
   providing a 360-degree camera mounted inside a police vehicle and operable to capture a 360-degree image of a scene in a field of view of the 360-degree camera;
   transmitting the 360-degree image to a digital processor coupled to the 360-degree camera;
   locating, via the digital processor, an area of the scene containing an object of interest;
   defining at least one region of interest within the 360-degree image corresponding to the area of the scene containing the object of interest;
   compressing to a first resolution a first subset of the omnidirectional image corresponding to the at least one region of interest;
   compressing to a second resolution a second subset of the omnidirectional image, the second subset being mutually exclusive to the first subset and the second resolution being lower than the first resolution;
   storing the first subset and the second subset in a storage medium coupled to the digital processor;
   coupling one or more antennae to the digital processor;
   detecting, via at least one of the one or more antennae and the digital processor, a signal from a signal-generating device;
   determining, by the digital processor, from what direction the signal came; and
   using the determined direction to define the at least one region of interest.

13. The system of claim 12, wherein the signal-generating device comprises a wireless microphone.

* * * * *